May 13, 1941.  T. M. BALL  2,242,021
CONNECTING LINK
Filed Sept. 1, 1939
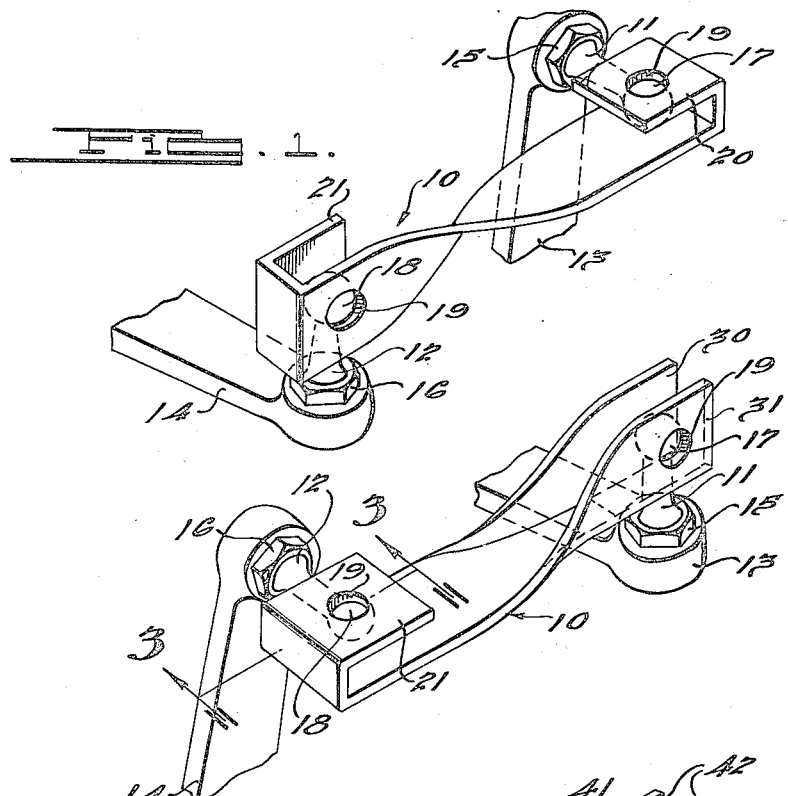
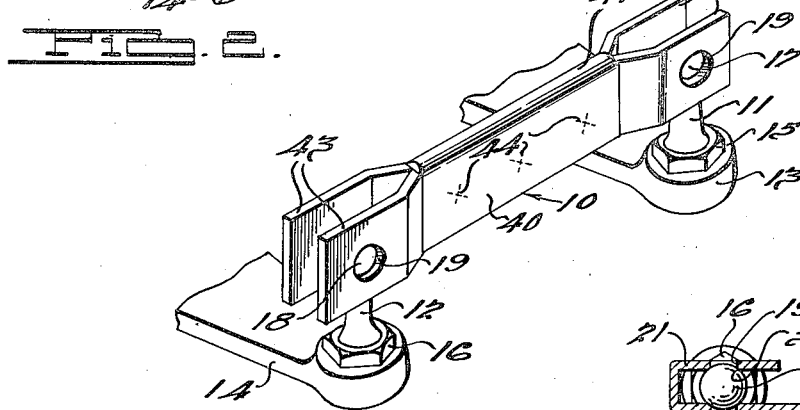
INVENTOR
Thomas M. Ball.
BY Harness, Dind, Patee & Harris
ATTORNEYS.

Patented May 13, 1941

2,242,021

UNITED STATES PATENT OFFICE 2,242,021

CONNECTING LINK

Thomas M. Ball, Detroit, Mich., assignor to Chrysler Corporation, Highland Park, Mich., a corporation of Delaware Application September 1, 1939, Serial No. 292,981

8 Claims. (Cl. 74—588)

My present invention relates to a universal socket joint connecting link for translating movement from one direction to another direction at an angle thereto, the invention being of utility in control linkages. A particular linkage to which the invention may be applied with resulting advantages is the linkage controlling the throttle valve or carburetor of an internal combustion engine, especially the internal combustion engine of an automotive vehicle.

The principal object of the present invention is to provide a durable connecting link of simple construction which is inexpensive to manufacture and unlikely to cause trouble by becoming loose or otherwise failing in service. A further object of the present invention is to provide a link assembled with ball-headed screws or bolts by means of which the link may be associated with other links to form a control linkage.

The objects and advantages of the present invention will be more readily apparent from a study of the following specification taken in connection with the accompanying drawing wherein like numerals refer to like parts throughout.

In the drawing, Fig. 1 discloses a preferred form of the present invention comprising an intermediate link having ball-headed bolts associated therewith and attached to the terminal levers of a control linkage;

Fig. 2 discloses a modified form of the present invention;

Fig. 3 is a detailed view in section taken along line 3—3 of Fig. 2; and,

Fig. 4 is a view of a second modification of the present invention.

In Fig. 1 there is disclosed a link 10 made in accordance with the present invention, the link being formed from a single flat bar of metal bent and worked to provide sockets at its extremities to accommodate ball-headed screws 11 and 12 which may be screwed into the ends of levers 13 and 14, respectively, and locked thereto by lock nuts 15 and 16, respectively. The ball-heads 17 and 18, respectively, of the ball-headed screws provide means for connecting the link 10 to the levers, the ball-heads being seated in openings 19 of lesser diameter which are drilled through the formed terminal portions of the link 10. As shown in Fig. 1, the link 10 is adapted to translate motion from a vertical lever to a horizontal lever by twisting the body or intermediate portion of the link through a right angle turn. The terminal sections of the link 10 are bent back upon themselves to form reversely directed portions 20 and 21 spaced from the adjacent portions of the body section a lesser distance than the diameter of the ball-heads and in the centers of which are drilled openings 19 opposite to the openings 19 in the body portion of the link.

A method of manufacturing the link shown in Fig. 1 is to deform a previously drilled, flat bar of metallic material in an unannealed state, the material being of such a character as to be workable before annealing and to take a permanent set upon being annealed. Preferably, the reversely directed portions 20 and 21 are folded down upon the previously positioned ball-headed screws 11 and 12, respectively, so that the forming operation associates the link 10 and the ball-headed screws 11 and 12 as a unit, the annealing operation thereafter performed operating to permanently associate the three parts in a unitary structure. On the other hand, the link 10 may be made of a material which is malleable before annealing or other treatment and which becomes resilient when annealed or otherwise treated, so that the ball-headed screws 11 and 12 may be associated with the link after treatment thereof by springing the terminal portions apart in order to accommodate the ball-heads. In such case the holes 19 might be drilled after formation of the link in order that the holes in the opposite portions of the hooked ends of the link may be definitely aligned. Either method of formation is satisfactory and contemplated.

A modification of the present invention is disclosed in Fig. 2 wherein a flat plate of metal is provided with a reversely directed terminal portion 21 similar in all respects to that previously described, whereas the opposite end is provided with lateral wings 30 and 31 which are bent upwardly from the plane of the body section to provide spaced parallel wings between which the ball-headed screw 11 may be embraced, the body of the link being narrowed and recessed between the wings in order to accommodate the vertically extending screw. As is true with regard to the form previously described, the wings 30 and 31 comprise portions of a flat plate which are bent out of the plane of the plate to provide spaced, substantially parallel portions in which are provided directly opposite openings 19 to receive the head 17 of the connecting ball-headed screw. It is obvious that both ends of a link may be provided with wings 30 and 31 shaped as disclosed, or that the opposite ends of the link may be provided with different forms of connecting means as shown in Fig. 2.

In Fig. 4 the invention is disclosed as comprising a substantially rectangular plate which is folded upon itself to provide a link having a body section 40 of double thickness. The fold 41 is cut away from each end of the link a substantial distance toward the center thereof so as to provide a pair of longitudinally extending wings 42 at one end of the link and a similar pair of longitudinally extending wings 43 at the opposite end of the link, the wings being bent outwardly from the plane of the body section, then bent reversely so as to provide spaced, parallel portions within which may be drilled the openings 19 to receive the ball-heads 17 and 18 of screws 11 and 12. The body section 40 may be strengthened to a greater extent, if desired, by spot-welding the two halves thereof together, as at 44. As is the case with the forms shown in Figs. 1 and 2, the form shown in Fig. 4 comprises a single plate of metal having its body section formed to align the space between the portions of the end terminals thereof with the connecting screws 11 and 12 and having its terminal sections shaped to provide laterally spaced, substantially parallel portions within which may be provided openings 19 to receive the ball-heads of connecting screws.

In Fig. 3 a detail of preferred construction is disclosed whereby the life of a linkage is prolonged and its ease of operation enhanced. As seen in the figure, it is preferred that the inner edges of the openings 19 be countersunk, as at 50, so as to provide flat, conical surfaces against which the spherical surface of the ball 17 or 18 may seat, thus eliminating the tendency of the edge of the openings 19 to wear a groove in the surface of the ball which might cause the linkage to stick in one position.

Having disclosed several modifications of the present invention, it should be apparent to those skilled in the art that the same permits of various alterations in arrangement and detail. All such as come within the scope of the following claims are considered a part of my invention.

I claim:

1. The improvement in universally jointed linkages of the type including at least one lever having a ball-headed member projecting therefrom, comprising a link formed of a single piece of sheet metal and including a central section and integral terminal sections, at least one of said terminal sections comprising a pair of substantially parallel portions spaced a lesser distance apart than the diameter of the head of said ball-headed member and between which is positioned the head of said ball-headed member, said portions being provided with aligned openings of lesser diameter than the diameter of the head of said member for the purpose of providing a permanent seat for the head of said member.

2. The improvement in universally jointed linkages of the type incuding at least one lever having a ball-headed member projecting therefrom, comprising a link formed of a single piece of sheet metal and including a central section and integral terminal sections, at least one of said terminal sections comprising a pair of substantially parallel portions spaced a lesser distance apart than the diameter of the head of said ball-headed member and between which is positioned the head of said ball-headed member, said portions being provided with aligned openings of lesser diameter than the diameter of the head of said member for the purpose of providing a permanent seat for the head of said member, the inner edges of said openings being angularly countersunk to provide conical seating surfaces for the spherical surface of said head.

3. The improvement in universally jointed linkages of the type including at least one lever having a ball-headed member projecting therefrom, comprising a link formed of a single piece of sheet metal and including a central section and integral terminal sections, at least one of said terminal sections comprising a reversely bent extension of said central section, the end thereof and the adjacent end of said central section forming a pair of substantially parallel portions spaced a lesser distance apart than the diameter of the head of said ball-headed member and between which is positioned the head of said ball-headed member, said portions being provided with aligned openings of lesser diameter than the diameter of the head of said member for the purpose of providing a permanent seat for the head of said member.

4. The improvement in universally jointed linkages of the type including at least one lever having a ball-headed member projecting therefrom, comprising a link formed of a single piece of sheet metal and including a central section and integral terminal sections, at least one of said terminal sections comprising a reversely bent extension of said central section, the end thereof and the adjacent end of said central section forming a pair of substantially parallel portions spaced a lesser distance apart than the diameter of the head of said ball-headed member and between which is positioned the head of said ball-headed member, said portions being provided with aligned openings of lesser diameter than the diameter of the head of said member for the purpose of providing a permanent seat for the head of said member, the inner edges of said openings being angularly countersunk to provide conical seating surfaces for the spherical surface of said head.

5. The improvement in universally jointed linkages of the type including at least one lever having a ball-headed member projecting therefrom, comprising a link formed of a single piece of sheet metal and including a central section and integral terminal sections, at least one of said terminal sections comprising a pair of lateral wings bent normal to the plane of the central section to form a pair of substantially parallel portions spaced a lesser distance apart than the diameter of the head of said ball-headed member and between which is positioned the head of said ball-headed member, said portions being provided with aligned openings of lesser diameter than the diameter of the head of said member for the purpose of providing a permanent seat for the head of said member.

6. The improvement in universally jointed linkages of the type including at least one lever having a ball-headed member projecting therefrom, comprising a link formed of a single piece of sheet metal and including a central section and integral terminal sections, at least one of said terminal sections comprising a pair of lateral wings bent normal to the plane of the central section to form a pair of substantially parallel portions spaced a lesser distance apart than the diameter of the head of said ball-headed member and between which is positioned the head of said ball-headed member, said portions being provided with aligned openings of lesser diameter than the diameter of the head of said member for the purpose of providing a permanent seat for the head of said member, the inner edges of said openings being angularly countersunk to provide conical seating surfaces for the spherical surface of said head.

7. The improvement in universally jointed linkages of the type including at least one lever having a ball-headed member projecting therefrom, comprising a link formed of a single piece of sheet metal and including a central section and integral terminal sections, said central section comprising a substantially rectangular sheet folded substantially along its longitudinal axis and at least one of said terminal sections comprising a longitudinal extension from the end of each half of said central section, said extensions being bent outwardly from the plane of said central section adjacent the end thereof and reversely bent at a spaced point so that the end thereof lies in a plane substantially parallel to and spaced from the plane of said central section to form a pair of substantially parallel portions spaced a lesser distance apart than the diameter of the head of said ball-headed member and between which is positioned the head of said ball-headed member, said portions being provided with aligned openings of lesser diameter than the diameter of the head of said member for the purpose of providing a permanent seat for the head of said member.

8. The improvement in universally jointed linkages of the type including at least one lever having a ball-headed member projecting therefrom, comprising a link formed of a single piece of sheet metal and including a central section and integral terminal sections, said central section comprising a substantially rectangular sheet folded substantially along its longitudinal axis and at least one of said terminal sections comprising a longitudinal extension from the end of each half of said central section, said extensions being bent outwardly from the plane of said central section adjacent the end thereof and reversely bent at a spaced point so that the end thereof lies in a plane substantially parallel to and spaced from the plane of said central section to form a pair of substantially parallel portions spaced a lesser distance apart than the diameter of the head of said ball-headed member and between which is positioned the head of said ball-headed member, said portions being provided with aligned openings of lesser diameter than the diameter of the head of said member for the purpose of providing a permanent seat for the head of said member, the inner edges of said openings being angularly countersunk to provide conical seating surfaces for the spherical surface of said head.

THOMAS M. BALL.